United States Patent
Tuckey

(10) Patent No.: US 6,430,181 B1
(45) Date of Patent: Aug. 6, 2002

(54) CROSSBAR SWITCH FABRIC WITH DETERMINISTIC MAXIMAL SCHEDULING OF CONNECTION REQUESTS WITH STRICT SCHEDULING PRIORITIZATION DERIVED FROM REQUESTED SERVICE DELAYS

(75) Inventor: Jeffrey S. Tuckey, Campbell, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/232,562

(22) Filed: Jan. 15, 1999

(51) Int. Cl.[7] .............................................. H04L 12/28
(52) U.S. Cl. ................... 370/386; 370/395.32
(58) Field of Search ................... 370/386, 387, 370/388, 395, 396, 412, 413, 414, 428, 232, 252, 417, 253, 220, 420, 411, 395.32; 709/227, 228, 232, 233

(56) References Cited

U.S. PATENT DOCUMENTS 5,517,495 A * 5/1996 Lund .......................... 370/399
6,072,772 A * 6/2000 Charny ........................ 370/229
6,134,217 A * 10/2000 Stiliades ...................... 370/232
6,144,662 A * 11/2000 Colmant ...................... 370/390
6,188,690 B1 * 2/2001 Holden ........................ 370/390

OTHER PUBLICATIONS

Nick McKeown and Thomas E. Anderson, "A Quantitative Comparison of Scheduling Algorithms for Input–Queued Switches," 1993.

Dimitrios Stiliadis and Anujan Varma, "Latency–Rate Servers: A General Model for Analysis of Traffic Scheduling Algorithms," UCSC–CRL–95–38, Jul. 1995.

* cited by examiner

Primary Examiner—Douglas Olms
Assistant Examiner—Ricardo M. Pizarro
(74) Attorney, Agent, or Firm—Christopher P. Maiorana, PC

(57) ABSTRACT

A cell scheduling and forwarding technique for an input-buffered N×N non-blocking crossbar switch which provides worst-case intra-switch port cell forwarding service delays which are bounded by the duration of N cell forwarding timeslots. This scheduler is further enhanced to support efficient rate based forwarding service.

19 Claims, 7 Drawing Sheets

BASIC SCHEDULING METHOD:
DUAL SYNCHRONIZED ROUND ROBIN SCANNING

THE DIAGONAL SCAN TECHNIQUE APPLIES TWO SYNCHRONIZED ROUND ROBIN SCHEDULES TO THE CONNECTION REQUEST AT EACH SWITCH ELEMENT:

- ONE ROUND ROBIN SCAN ACROSS THE INPUT PORTS FOR A GIVEN OUTPUT PORT RESOLVES THE FANIN CONTENTION.
- THE OTHER ROUND ROBIN SCAN ACROSS THE OUTPUT PORTS FOR A GIVEN INPUT PORT RESOLVES THE FANOUT CONTENTION.

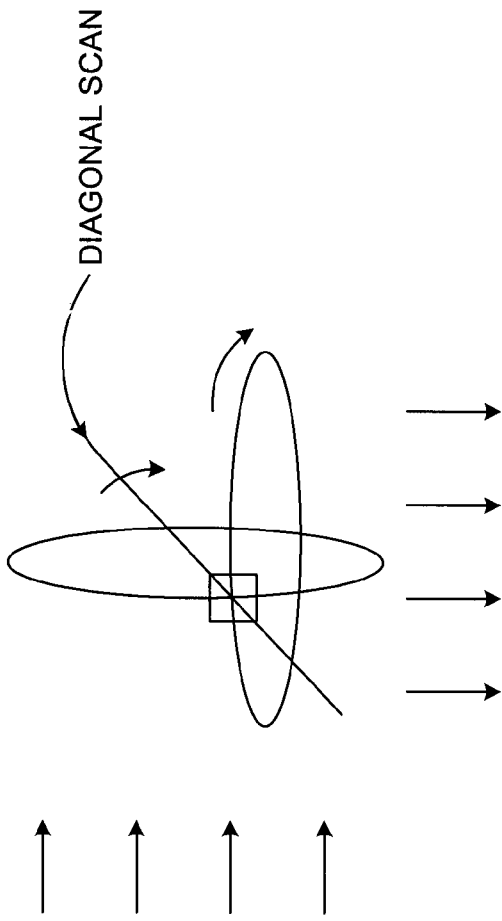

FIG. 3

SIMPLE MAXIMAL MATCHING:

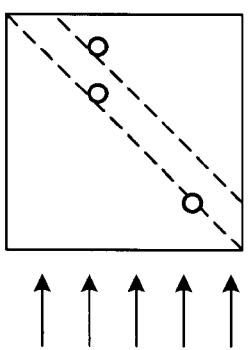

WITH CONNECTION REQUESTS LOCALLY STORE

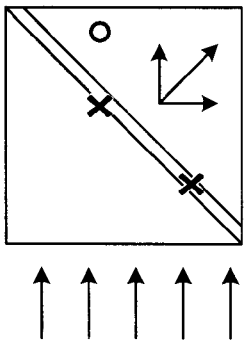

BEGINNING OF DIAGONAL SCHEDULING SCAN

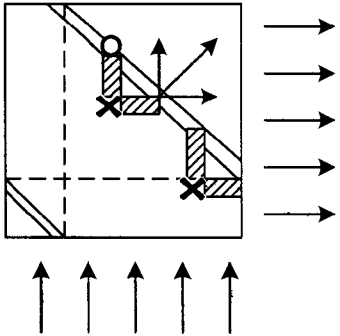

A SHORT TIME LATER...

× LOCALLY GRANTED CONNECTION REQUEST
○ VALID CONNECTION REQUEST
▨ PORT RESOLVED (EITHER INPUT OR OUTPUT)

THE TEMPORAL COMPLEXITY OF THE SCHEDULING ALGORITHM IS $O_t(N)$, WHERE N IS THE NUMBER OF THE PORTS CONNECTING TO THE NxN FABRIC. THIS EXCLUDES REQUEST SUBMISSION AND GRANT RETRIEVAL.

FIG. 4

CROSSBAR SWITCH FABRIC WITH DETERMINISTIC MAXIMAL SCHEDULING OF CONNECTION REQUESTS WITH STRICT SCHEDULING PRIORITIZATION DERIVED FROM REQUESTED SERVICE DELAYS

BACKGROUND OF THE INVENTION

1. Field of the Invention

The present invention relates to a connection scheduler for a crossbar switch and, more particularly, pertains to a scheduling technique for an input-buffered N×N non-blocking crossbar switch which can be enhanced to support rate-based traffic scheduling. Simulation results indicate that the rate-based scheduling mechanism of this invention provides an excellent average bounding of the difference between requested service delay and actual service delay through the switch fabric. This behavior is robust to a large variety of traffic patterns as long as the requested traffic load is no greater than a large fraction of unity, γ. These empirical results are described with reference to the simulations discussed in the Detailed Description of the Preferred Embodiments.

2. Description of the Related Art

A variety of connection schedulers are known in the art. Each employs one or several scheduling policies. These policies range from simple and practical schemes such as Strict Priority, Round Robin, or Weighted Round Robin, to more elaborate schemes such as Weighted Fair Queuing. There are also many variations of these policies and other policies known in the literature.

A few of the typical performance metrics used to compare the various scheduling methods are jitter and latency of data delivery, fairness of arbitration, and scalability of port count and port bandwidth. Simpler scheduling methods provide only best effort delivery of traffic, while other more complex methods allow traffic flows to establish contracts that establish certain performance guarantees with the network. Typical of these guarantees is the provision of a minimum bandwidth capacity to a traffic flow. Slightly more elaborate traffic contracts may also offer a maximum bounding of cell delivery jitter or delay.

SUMMARY OF THE INVENTION

The present invention is a component of a crossbar data switch. Such a switch must have several components. It must have multiple network interfaces. It must have some amount of data buffering at the ingress of the switch. This buffer is able to receive packets at the network interface line rate, and to forward packets at the rate supported by the crossbar switch fabric. When there is contention for an output port of the crossbar from more than one of its input ports, then the buffering at those input ports will be used to store packets for the duration of the mismatch of the receive and forwarding rates caused by contention from other inbound ports for the outbound switch port. If contention is sufficiently long lasting, inbound buffering may become full, and packets will be dropped as a result. There must be an inbound controller to the crossbar that keeps track of how many traffic flows reside in the buffering, where their packets reside, and which outbound port they are destined to. Using this information it must submit forwarding requests to the scheduler, retrieve grants from the scheduler and forward traffic on the granted connection paths. Outbound buffering may also be used to match the crossbar forwarding rate to the outbound network interface line rate. Inbound and outbound controllers may also be responsible for multiplexing traffic from multiple network interfaces into a shared crossbar port, or for demultiplexing traffic from a common outbound switch port to multiple network interface destinations, respectively.

FIG. 1 illustrates a block diagram for an exemplary, preferred crossbar buffered switch 10 according to the present invention. Inbound port controllers 12 buffer data from the physical network link 11, and forward this data across the switch fabric 13. To forward data, the inbound port controllers 12 must participate in cell scheduling which involves the submission of requests and the retrieval of grants. Outbound port controllers 14 receive cells from the fabric 13 and transmit them to a physical network link 15 with minimal buffering being required. An input port controller 12 or output port controller 14 may attach to the fabric 13 in more than one location to improve the physical distribution of I/O bandwidth for a particular implementation. Also shown in FIG. 1 is a connection scheduler 17, herein composed of an active diagonal sequencer 16 and a grant selector 18, which is described below. The grant selector 18 is described in the enclosed pseudo code.

Of these necessary mechanisms for a crossbar data switch, only the connection scheduler is described in detail. The other mechanisms are conventional.

The present invention describes a simple best effort scheduler named Max2d. The present invention also describes a more elaborate scheduler, named Rate2d, that provides minimum average bandwidth guarantees. The Rate2d method is an elaboration of the Max2d method. Both Max2d and Rate2d scale well to implementations with very large port number and per port bandwidth.

In accordance with a specific illustrative embodiment of the present invention, a connection scheduler for an input-buffered N×N crossbar switch is presented.

In one aspect of the present invention, the connection scheduler 17 and forwarder 23 are constructed from a two-dimensional cooperative mesh of one-dimensional round robin schedulers. There are 2*N one-dimensional round robin schedules at work, one scheduler 17 associated with each of N input ports 19A–N of the fabric 13 and one scheduler 17 associated with each of N output ports 21A–N of the fabric 13. Although round robin scheduling is well known in the art, the manner in which the schedules employed by this invention cooperate is novel. This cooperative synchronization of the round robin schedulers achieves maximal matching among a set of $N^2$ possible requests from N input ports 19 to N output ports 21. This cooperative synchronization of round robin schedulers is the fundamental basis of this invention and will be referred to as two dimensional round robin scheduling.

Two dimensional round robin scheduling is described in detail as the specification of Max2d. This connection scheduler 17 works in conjunction with a data forwarder 23 as described earlier in this section.

In another aspect of the present invention, the Max2d scheduler is enhanced to implement a rate-based scheduler with deterministic maximal scheduling of connection requests with strict scheduling prioritization derived from requested service delays. This enhanced scheduling method is named Rate2d, and is empirically shown to provide minimum average bandwidth guarantees.

In a broad aspect of the present invention, the connection scheduler for an input-buffered N×N non-blocking crossbar switch is adapted to support rate-based traffic scheduling and to provide average-case inter-switch port cell forwarding service delays which are deterministic and well bounded.

In another aspect of the present invention, the connection scheduler is adapted to implement maximal scheduling of connection requests with strict scheduling prioritization derived from requested service delays.

In another aspect of the present invention, the connection scheduler 17 implements a two-dimensionally synchronized round robin arbitration of connection requests stored at the switch elements $SE_{yx}$ (where $0 \leq y \leq N-1$ and $0 \leq x \leq N-1$) of a crossbar switch fabric 13.

In another aspect of the present invention, the connection scheduler 17 is adapted to implement maximal matching among a set of $N^2$ possible requests from N input ports 19 to N output ports 21 of a crossbar switch fabric 13. Arbitration of a single matching completes in order N time.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 3 illustrates the two dimensional round robin scheduling method implemented by the Max2d connection scheduler of the present invention;

FIG. 4 illustrates the action of the Max2d scheduler after a single timestep;

DETAILED DESCRIPTION OF THE PREFERRED EMBODIMENTS

Preliminary Notational Conventions and Terminology

Figure 1:
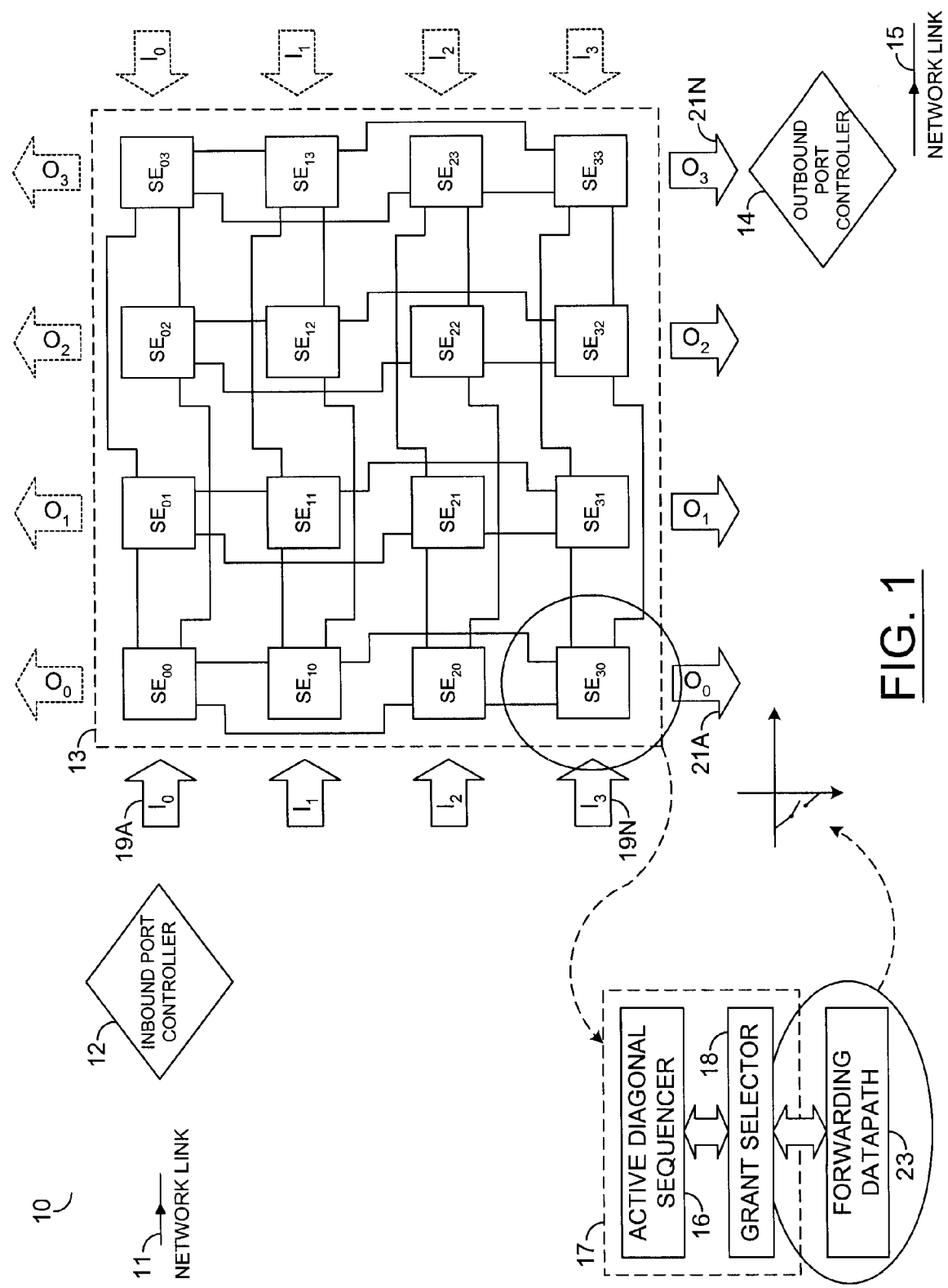
FIG. 1 shows a physical implementation of an exemplary, preferred embodiment of a connection scheduler according to the present invention.

Unless otherwise noted, the use of the term "switch fabric," or simply "fabric" will refer specifically to a conforming implementation of the connection scheduler of the present invention.

The process of forwarding data through the switch fabric involves "submitting" requests into the fabric, retrieving connection "grant" status from the scheduler fabric, and finally, "forwarding" data across the granted connections. These steps are repeated in a periodic manner with respect to a constant period of time, $\tau_f$, known as the "minimum arbitable data forwarding time," or the "forwarding slot time."

A connection request identifies one of N output switch ports to form a connection to, and one of N input ports to form a connection from. A connection request is labeled $R_{ij}$, where i is the requested input port and j is the requested output port.

A connection request is "resolved" if either its input or its output port has been matched to a granted connection. Note that this does not mean the same thing as being granted. If a request is granted, then it will be serviced in the next $\tau_f$ slot. If a request has been resolved, then it has either been granted, or it has been blocked by a granted connection. A connection request can be blocked by a granted connection if their input ports are identical. This is known as "fanout contention." Alternatively, a connection request can be blocked by a granted connection if the output ports are the same. This is called "fanin contention." Of course, two different requests can have at most one port in common. Even in light of this blocking behavior., the fabric is considered "non-blocking." This is because there are no internally scarce resources in the fabric which can cause connections to block. Blocking can only occur at the ingress or egress of the fabric.

The grant selection algorithm is conducted by a systolic array machine. This means that it is carried out by a collection of small state machines, generically known as switching elements (SE), working together in lock step and with strictly local "nearest neighbor" communications. Wherever the ij subscript notation is used, it is implicitly associated with a specific SE location in the crossbar switch fabric.

More specifically, the set of connection requests, R, is labeled using an array that mimics the logical structure of the systolic array:

$$R = [R_{ij}] = \begin{pmatrix} R_{00} & R_{01} & \cdots & R_{0(N-1)} \\ R_{10} & R_{11} & \cdots & R_{1(N-1)} \\ \vdots & \vdots & \ddots & \vdots \\ R_{(N-1)0} & R_{(N-1)1} & \cdots & R_{(N-1)(N-1)} \end{pmatrix}$$

The input ports are labeled with the column vector:

$$P^I = \begin{bmatrix} P^I_0 \\ P^I_1 \\ \vdots \\ P^I_{N-1} \end{bmatrix}$$

and the output ports are labeled with the row vector:

$$[P^O_1 P^O_2 \ldots P^O_{N-1}]$$

The i index of $R_{ij}$ identifies the input port, $P^I_i$ associated with any given request. Similarly, the j index identifies the associated output port $P^O_j$. Although there are several other equally valid ways to describe the set of connection requests, this convention is employed for labeling SE logical addresses, as there is no loss of generality in doing so.

An SE can communicate only with its four nearest neighbors along the four compass directions: North, South, East and West. These direction names (or their abbreviations N, S, E, W) may be used in the notation when identifying a given SE relative to another SE. A nearest neighbor of a given SE, for the purposes of describing valid communication paths, can only be the nearest neighbor to the immediate North, South, East or West.

Figure 2:
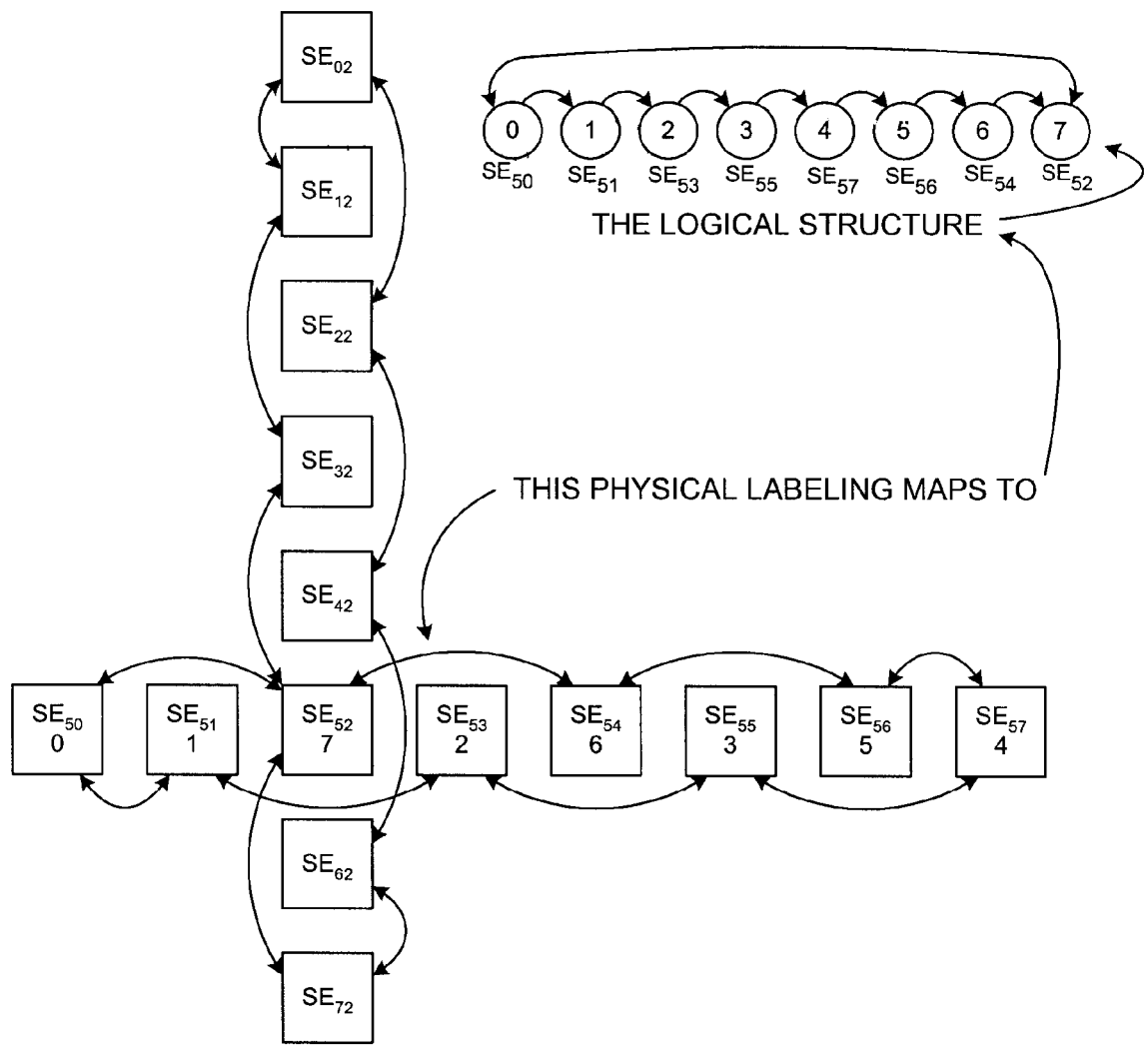
FIG. 2 illustrates the relationship between the logical and physical structures used in an implementation of the connection scheduler and date forwarder.

The systolic array is a simple torus, with the Far West column being able to communicate with its westerly neighbor, the Far East column. The channels are duplex, so the Far East can also talk to its immediately eastern neighbor, the Far West. Similarly, the Far North row and the Far South row also communicate as neighbors. In the logical structure, these communication paths appear to be implemented by nonlocal communication paths. However, the physical structure exploits a well known technique for mapping simple toroidal meshes to the plane. FIG. 2 demonstrates this mapping for one row and one column of an 8×8 crossbar. This physical mapping of the logical array allows all nearest neighbor communication paths to be implemented with similar physical delays. No more will be mentioned of the physical structure of the systolic machine since it can be easily derived from the logical structure, and the logical structure is more easily referenced.

"Logical south" is defined to be in the direction of increasing row indices modulo N. Similar definitions are presumed for the other three main compass directions. It is also desirable to describe an inclusive region of rows between a starting and ending row, x and y. As rows can be traversed from x in either a logically southern or northern direction and still arrive at row y, it is necessary to be explicit about the directionality of any region to be described by its endpoints. Therefore, the notation S[x,y] is used to denote the ordered tuple of rows that are traversed when traveling from row x to row y in the direction of logical south. Let S[x,y) denote the same group, except that it excludes row y. Similar operator definitions are presumed for referencing groups of columns or rows in the other three compass directions.

Finally, when reference is made to "local state," it means specifically that $SE_{ij}$ has some state which holds some information concerning the current relationship of input port $P^I_i$ and output port $P^O_j$ for any $i,j \in 1,2,3 \ldots N$.

Maximal Matching

Arbitrating connections for a crossbar 10 is an example of bipartite matching. Given a graph, $G_R=(V,E)$ with vertex set V and edge set E, a matching is defined as a subset of edges $M \subset E$ such that for any vertex, $v \in V$, there is at most one edge from M incident upon v.

In bipartite matching, the graph $G_R$ is partitioned into two sets of vertices, $V_I$ and $V_O$, such that $V_I \cup V_O = V$ and $V_I \cap V_O = \phi$. Then, only considered are the edges, $E' \subset E$ such that any edge in E' has one vertex in $V_I$ and the other vertex in $V_O$. It is on the reduced graph, $G_R'=(V,E')$, that a matching is sought.

N×N crossbar grant selection is a specific incidence of bipartite matching where the input ports compose the $V_I$ set of vertices, and the output ports are the other set of vertices, $V_O$. In this context, finding a matching is the same as deciding which unicast connection requests can be granted service during a given data forwarding slot. At most, N of the potential $N^2$ outstanding requests can be serviced in one data forwarding slot.

A "maximum" matching is one such that no other possible matching has a greater number of edges. A "maximal" matching is one such that no other edges can be added to it without violating the definition of a matching. Therefore, it is equivalent to define a maximal matching as one in which all connection requests have been resolved.

Maximum matchings are maximal, but maximal matchings are not necessarily maximum matchings since it may be possible to remove some edges and to add others in order to increase the total number of edges in the matching.

FIG. 3 illustrates the two dimensional round robin scheduling method implemented by the Max2d connection scheduler 10 of the present invention.

FIG. 4 illustrates the action of the Max2d scheduler 10 after a single timestep.

Figure 5A:
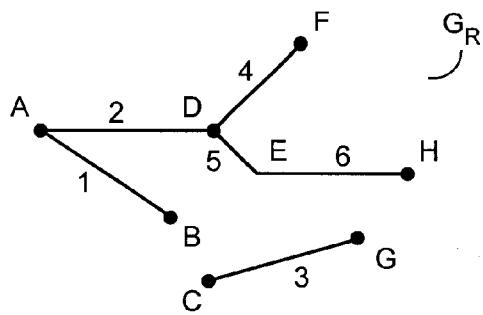
FIGS. 5A–5E illustrate specific examples that formally define and explain maximal birpartite matching, also referred to as simply "maximal matching"
Figure 5B:
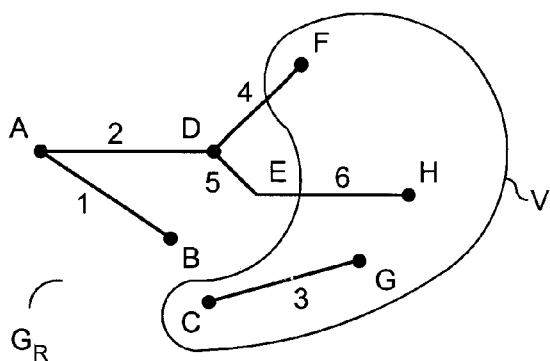
Figure 5C:
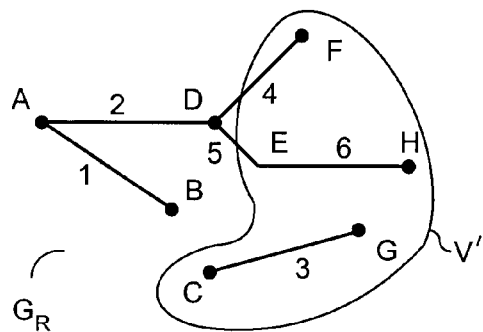
Figure 5D:
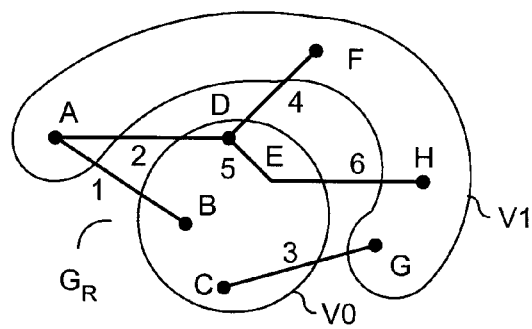
Figure 5E:
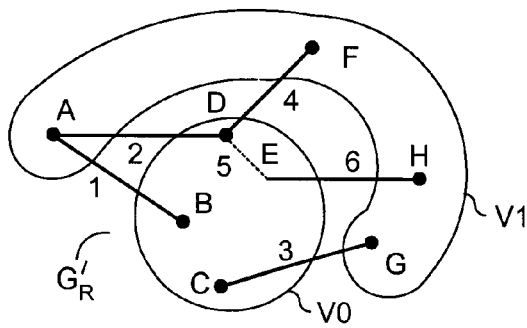

FIGS. 5A–5E show specific examples of graph matching, bipartite graph reduction and maximal and maximum bipartite matching. FIG. 5A shows an exemplary arbitrary graph $G_R$ which has its edge set labeled with numerals 1–5 and its vertex set labeled with letters A–G. In FIG. 5B, the edge subset V={3,4,6} is a valid matching. In FIG. 5C, the edge set V'={3,4,5,6} is not a valid matching of a graph. Edges 5 and 6 cannot be included simultaneously in a valid matching in this example, since they both connect to vertex E, which is in violation of the definition of a valid matching. By partitioning the graph $G_R$ of FIG. 5D into two sets of vertices, $V_O$={B,C,D,E} and $V_I$={A,F,G,H}, the reduced graph, $G_R'$ shown in FIG. 5E on which to consider bipartite matchings is constructed. The edge (D,E) does not exist in the reduced graph $G_R'$. By virtue of the construction of $G_R'$, any valid matching on $G_R'$ is a valid bipartite matching on $V_O$ and $V_I$. There are two valid maximal matchings: M1={1,3,4,6} and M2={2,6,3}. M1 is also a maximum matching, while M2 is not.

Max2d selects a matching in $\Theta_t(N)$ time with $\Theta_x(N)$ spatial complexity, where N is the number of input ports and the number of output ports. This matching algorithm is guaranteed to find a maximal matching among a set of $N^2$ possible requests from N input ports to N output ports.

Appropriate adjustments made to the connection scheduling algorithm implement maximal matching among a set of M*N possible requests from M input ports to N output ports, where M≠N.

Max2d: a Two Dimensional Round Robin Scheduler

To enable the description of Max2d, a canonical labeling of the diagonals of the systolic array will now be described. Recall that the canonical row and column labels were described in the earlier section on notation. Let $d_x$ represent the subset of switch elements along the diagonal of the logical array that intersects the first column at the $x^{th}$ row.

More Explicitly:

$$d_x = \{SE_{ij} | \leq i,j \leq (N-1) \text{ and } i=(j+x) \bmod N\}$$

For example, in the following 3×3 array, the $d_1$ diagonal is shown in bold font.

$$R = \begin{pmatrix} R_{00} & R_{01} & R_{02} \\ R_{10} & R_{11} & R_{12} \\ R_{20} & R_{21} & R_{22} \end{pmatrix}$$

Max2d proceeds in N timesteps, $t_0$ through $t_{(N-1)}$. During timestep $t_x$, diagonal $d_x$, determines whether it has any valid connection requests that are not yet resolved. If th ere are such requests, then they are granted. The actions performed in each timestep take a constant time, $\Theta_t(1)$.

This algorithm is now examined in greater detail in order to prove that it resolves all valid requests.

The pseudo-code set forth below expresses how Max2d performs grant selection. It does not express how requests are submitted to the fabric, or how grants are retrieved from the fabric. These details are beyond the scope of Max2d, which is only a grant selection algorithm. Also, the initial value of the active variable will be TRUE only for those switch elements that lie upon a single diagonal, the initially active diagonal of Max2d. (The manner in which Max2d selects the initially active diagonal is described below.)

At the start of $t_0$, all valid requests are unresolved and all valid requests have been accepted and stored locally in the fabric. At the conclusion of Max2d, which occurs at the end of timestep $t_{(N-1)}$, the grants are stored locally in the fabric awaiting retrieval.

All variables represent stored circuit state and use ij subscript notation to indicate state local to a particular SE. The character '=' is used for variable assignment, while '==' is used to evaluate an expression for equality.

Note that nearest neighbor communication is indicated by +1 or −1 array index notation. This notation represents arithmetic that is modular relative to N such that j+1 equals 0 if j=N−1, and i−1=N−1 if i=0. Offsets of only plus or minus one are allowed, since other offsets would not qualify as nearest neighbor communication. Also, only a single index is offset at a given time, since there is no communication at any single moment among the SEs on any given diagonal.

Any reference to a variable at time (t+1) can only occur in the left hand side of an assignment. This constraint implies that only current state is communicated among neighbors. In the most structurally immediate implementation of the pseudo-code, these references correspond to the D and Q ports of a D flip-flop, respectively.

If (resolved$_{(i-1)j}$(t)
Or resolved$_{i(j+1)}$(t)) Then
begin
resolved$_{ij}$(t+1)=TRUE
end
else If ((request$_{ij}$==TRUE)
And (active$_{ij}$(t)==TRUE)) Then
begin
grant$_{ij}$(t+1)=TRUE
resolved$_{ij}$(t+1)=TRUE
end
If ((active$_{(i-1)j}$(t)==TRUE)
And (active$_{i(j+1)}$(t)==TRUE)) Then
begin
active$_{ij}$ (t+1)=TRUE
end Proof that Scheduler Matchings are Maximal With $d_0$ as the initially active diagonal, the principle of induction can be used to show that for some 0<m<(N−1), all connection requests along the active diagonal of timestep $t_m, d_m$, have their connection requests resolved by the completion of timestep $t_m$.

FACT 1: After the first timestep at $t_0$, any $SE_{kk} \in d_0$ either did not have a valid connection request or has had its connection request granted. Therefore, any valid requests in $d_0$ are resolved by the completion of $t_0$.

FACT 2: For any $R_{ij} \in d_{(m+1)}$, the northern neighbor $N(R_{ij})=R_{(i-1)j}$, and the eastern neighbor, $E(R_{ij})=R_{i(j+1)}$ are both elements of $d_m$ by the canonical definition of the diagonal. It is true by inspection of the above pseudocode that the resolution of a connection request at any given SE, $X \in d(m+1)$, at timestep t+1 depends only on the state of its neighbors N(A) and E(X) at timestep t. Since N(X) and E(X) are both members of $d_m$, it must be true that if $d_m$ has all of its connection requests resolved at the time of timestep t, then d(m+1) must have all of its connection requests resolved at the end of timestep t+1.

By the principle of induction, facts 1 and 2 above are sufficient to show that any cell scheduler conforming with the description of this invention of size N×N will resolve all of its requests by the end of the $N^{th}$ timestep, where the duration of a timestep is dependent upon the details of a specific implementation.

Since all requests are resolved by this scheduling algorithm, it is a maximal scheduling algorithm.

Note that the above proof presumed that the initially active diagonal was $d_0$. This was not necessary except as a means of simplifying the notation of the variables presented. The above presentation can be considered to apply to any initially active diagonal, given an appropriate relabelling of the switch elements, since all diagonals are topologically equivalent with respect to the nearest neighbor communication paths utilized during arbitration (disregarding the connections used for request submission or grant retrieval).

Loosely Work Conserving

An "ideal work conservative scheduler" will assign available datapath resources to forward packets as soon as they arrive at the switch. A "loosely work conservative scheduler" will assign available datapath resources to forward packets within some finite delay period of the packet's arrival at the switch.

Requests are generated by input ports based upon traffic demand. Max2d provides a loosely work conservative service. Service is not strictly work conservative, since only maximal bipartite matching is provided, instead of maximum bipartite matching. In the worst case, a maximal match will only match half as many edges as a maximum match can.

However, connection requests are guaranteed to be granted by Max2d within a small and constant worst case time delay, $\tau_{wc}$ from their desired service time. For this behavior the term "loosely work conservative," or LWC ($\tau_{wc}$), is employed.

The scheduling algorithm Max2d is LWC(N*$\tau_f$). This is a simple result of the way in which the initially active diagonal varies over time. In general, it cannot be guaranteed that a given connection request will be granted by a single sweep of the active diagonal, but there is an important exception. The active diagonal at timestep $t_0$ is guaranteed to have all valid requests granted. Since all diagonals will be the active diagonal within any window of N timesteps, any request is guaranteed to be granted within N timesteps. This point is made clear by the following explanation of how the initially active diagonal is chosen.

Let the forwarding slots be numbered from 0 to N−1 in a periodic manner, i.e., $$\text{num}((k+1)*\tau_f)=(\text{num}(k*\tau_f)+1) \bmod N$$

and num(0)=0. Now, if the initially active diagonal at $t_O$ is chosen to be $d_x$, where x=num(t), instead of always being $d_0$, then all connection requests are guaranteed to lie on the active diagonal of $t_0$ within N forwarding times. In other words, all requests are guaranteed to be serviced within N slot times of their acceptance into the fabric.

Rate2d: Supporting a Requested Connection-Service Time

In Rate2d, a request also specifies a service delay, $D_s(R_{ij}, t)$, which is defined as the number of integral $\tau_f$ periods for which the service of a requested connection is appropriately delayed. $D_s$ is called the "requested service delay." Requested service delays are stored locally in timers in the switch fabric. The fabric generally decrements these service delay timers in the fabric once during each forwarding slot to reflect the passage of time in integral units of the minimum forwarding slot period. Ideally, a request will never be serviced any later than the time slot in which its service delay timer becomes zero, which is the moment of its desired service time. This moment is also known as the request's "deadline."

Figure 6:
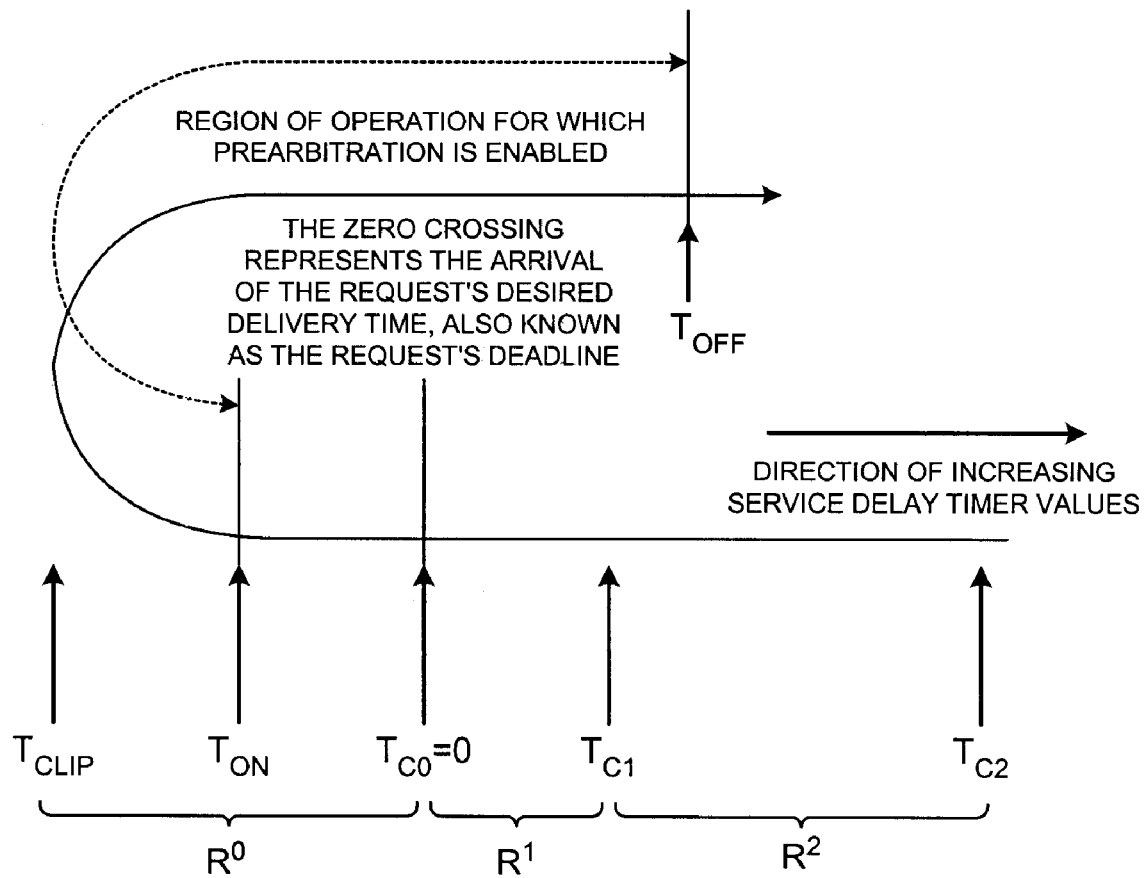
FIG. 6 depicts all of the thresholds used by Rate2d.

FIG. 6 depicts all of the threshold comparisons made against the service delay timers by Rate2d, and reviews the role that these thresholds play in the Rate2d scheduler. A request's service delay timer must be less than or equal to $T_{c2}$ in order to be eligible for grants. All requests with service delays between $T_{c1}$ and $T_{c2}$ are granted connections with equal likelihood. Typically, $T_{c2}$ is much larger than $T_{c1}$ and $T_{c1}$ is greater than $T_{c0}$, but not by as large a margin. $T_{c2}$, $T_{c1}$, $T_{c0}$ and $T_{clip}$ serve as boundaries for three classes of traffic that are considered for grant selection. These classes are serviced with strict priority relative to;one another, with the higher priority classes containing requests that are nearer to their deadlines than those of lower priority classes. The highest priority class contains all requests that have missed their deadlines. Service delay timers will never contain values less than $T_{clip}$, as the timers are not decremented when any service delay timer has a value of $T_{clip}$. When a timer is stuck at $T_{clip}$, it must be granted service in order for its timer to increment to its next desired service time. When this occurs, and there are no more timers stuck at $T_{clip}$, then the timers will again decrement by one with each forwarding slot to measure the effective passage of time. $T_{on}$ and $T_{off}$ are thresholds that are used to measure which connections are chronically receiving too little service, or too much service, respectively. When a connection's service delay timer falls to $T_{on}$, it is enabled for prearbitration, a method of improving its chances of receiving grants, and therefore of boosting its data forwarding rate. Such a request will continue to participate in prearbitration until its service delay timer meets or exceeds the $T_{off}$ threshold. This indicates that it has received a sufficient boost of forwarding rate for a sufficient period of time, and no longer needs to participate in prearbitration, until such time that its service delay timer may again fall to $T_{on}$.

Rate2d conducts a short sequential series of Max2d grant selections, where the requests participating in each application of Max2d are of progressively lower priority. All applications of Max2d scanning by Rate2d within a single timeslot have identical initially active diagonals. These initially active diagonals are selected exactly as in Max2d. Namely, the initially active diagonal is $d_x$, where x=num(t) as was previously defined for Max2d.

The initially active diagonal varies in a simple periodic manner which is identical to the method used by Max2d, and is therefore independent of the positions of the mutually blocking requests from which it selects, just as in Max2d. Therefore, a request is selected at random from mutually blocking requests within a given priority class.

Rate2d is also adapted to eliminate long term proportional unfairness between any two requests. In other words, as time passes, a client's request for a fixed rate of data transfer will be derated by the inefficiency of the Rate2d scheduling mechanism. The efficiency of Rate2d for a given request $R_{ij}$, is defined in terms of its requested rate, $R^r$, and its achieved rate of data transfer, $R^a$, as $E_{ij}=R^a{}_{ij}/R^r{}_{ij}$. For any two switch elements, $SE_{ij}$ and $SE_{kl}$, $E_{ij}-E_{kl}$ approaches zero as time passes, for any static set of request rates, R, statically maintained over the interval of measurement. The mechanism by which Rate2d accomplishes this is explained in the following section.

Sources of Scheduling Inefficiency

Ideally, it should be invariantly true that any request $R_{ij}$ is serviced with strictly higher priority than any other request $R_{mn}$ if and only if $D_s(R_{ij})<D_s(R_{mn})$. In practice, rough approximations of this invariance are sufficient to achieve acceptable data forwarding efficiencies. According to the present invention, all requests are partitioned into a small number of mutually exclusive classes $R^k$ where $0<k<L$. The construction of this partition is based upon the values of their service delay timers. For any $R^u$ and $R^v$ such that u<v, all requests within $R^u$ are scheduled with strict priority over all requests within $R^v$. The number of classes in the partition is L+1. In the implementation most thoroughly examined to date, L+1=3.

Requests in the highest priority class, $R^0$, are matched by the application of the Max2d grant selection method. Progressively lower priority requests, $R^1$ through $R^L$, are then added to the grant matching by further applications of Max2d. These applications of Max2d cannot overlap in time, since later applications of Max2d depend upon the complete results of earlier applications. Attempts to avoid this serial dependency by reducing the requirement of strict priority service among classes lead to undesirable effects, both in terms of fairness properties of the scheduler and data dependent forwarding inefficiencies.

This simplification from the ideal reduces the temporal complexity of the grant selection algorithm. This serves to directly reduce the packet delivery latency of the data forwarder which is, generally, a desirable effect.

However, there is some inefficiency in the scheduler's forwarding efficiency due to this approximation. This is due to a simple fact: If a request with a less critical deadline is granted when a request with a more urgent deadline within the same priority class, $R^x$, was also available for granting, and where the two requests are mutually blocking (they have an input or output port in common), then it is possible that the more critical request will miss its deadline as a result.

Proportional, Non-Absolute, Rates are Provided.

In general, round robin schedulers applied to N ports can only guarantee a minimum average bandwidth of 1/N of the total capacity to any given port. This result is well known. This worst case occurs when all ports simultaneously wish to send traffic to a single output port. However, a key aspect of the present invention is its ability to provide greater than 1/N minimum average bandwidth reservations. Though this has not been analytically proven, it has been empirically demonstrated. The basic mechanism is clear: Rate2d prevents too many requests from piling up to form a traffic jam within any given priority $R^x$ round robin service class, such that individual rates of greater than 1/N of the total port bandwidth can be maintained. In order to do this, Rate2d must scale back all forwarding rates slightly from the ideal of unity load, since there are inherent inefficiencies in the scheduler that must be accounted for.

This is the fact that Rate2d exploits to provide proportional rate service. In a preferred embodiment, Rate2d measures and selects a subset of connection requests that have received sufficiently less than their fair share of service in the recent past. This subset participates in prearbitration: a 2-dim. round robin scheduling just like the arbitration so far described, except that it takes place in the previous forwarding slot, $T_{cur-1}$, but applies to the grant selection of the currently arbitrated slot, $T_{cur}$.

In contrast to prearbitration, arbitration takes place during $T_{cur}$ and also applies to the grant matching of $T_{cur}$. Since grants selected by arbitration can be blocked by requests of the same priority that were granted by prearbitration, it is easy to see why qualifying for prearbitration leads to an increase in a connection's achieved data forwarding rate. This tends to cool off the hotspots of any particular static request distribution, R, and leads to a very efficient achieved throughput capacity relative to ideal unity for any given path through the switch.

Proportional rates are provided by this mechanism, but not necessarily absolute rates. If a maximum bound on the inefficiency of the fabric can be determined, then absolute rates could be provided by increasing the forwarder's peak bandwidth by a factor of the reciprocal of the worst case efficiency ratio of the scheduler. Simulation across a wide variety of reservation patterns has been performed. These simulation results indicate that such a worst case bound may well exist, though it has not yet been elaborated analytically.

Simulation Results.

Simulations were conducted for 99 different simulated traffic patterns. Each test was run for 1,000,000 consecutive forwarding slots. All $N^2$ requested rates within the fabric did not vary over the course of the simulation. Each traffic pattern was also a unity load configuration. This means that the requested forwarding rates when summed from input port, $P_x$, x=0 to x=N−1, over all requests, $R_{xy}$, such that y is any given output port, will always add to unity load. The duplex symmetric summation from output port, $P_y$, y=0 to y=N−1, over all requests, $R_{xy}$, such that x represents any given particualar input port, also adds to unity. All datasets were randomly generated. Any statistical bias in the distribution of the resulting datasets was not intended but could conceivably have resulted from an, as of yet, unnoticed bias in the dataset generation algorithm.

The arbitration algorithm used for all 99 simulations was configured with the following parameters (which are illustrated in FIG. 6): $T_{clip}$ was set to −6; $T_{on}$ was set to −2; and $T_{off}$ was set to 4. All requests were partitioned into 4 sets, $R_0$, $R_1$, $R_2$, and the ineligible set. The highest priority set, $R_0$, contained all requests with a service delay timer value less than or equal to $T_{c0}$=0. The next highest priority set, $R_1$, contained all requests with a service delay timer value less than or equal to $T_{c1}$=4, but greater than $T_{c0}$. The lowest priority class, $R_2$, contained all requests with a service delay timer value less than or equal to $T_{c2}$=20, but greater than $T_{c1}$. Any request with a service delay timer value larger than $T_{c2}$ is in the ineligible set, and can not be granted service in the current forwarding slot.

Figure 7:
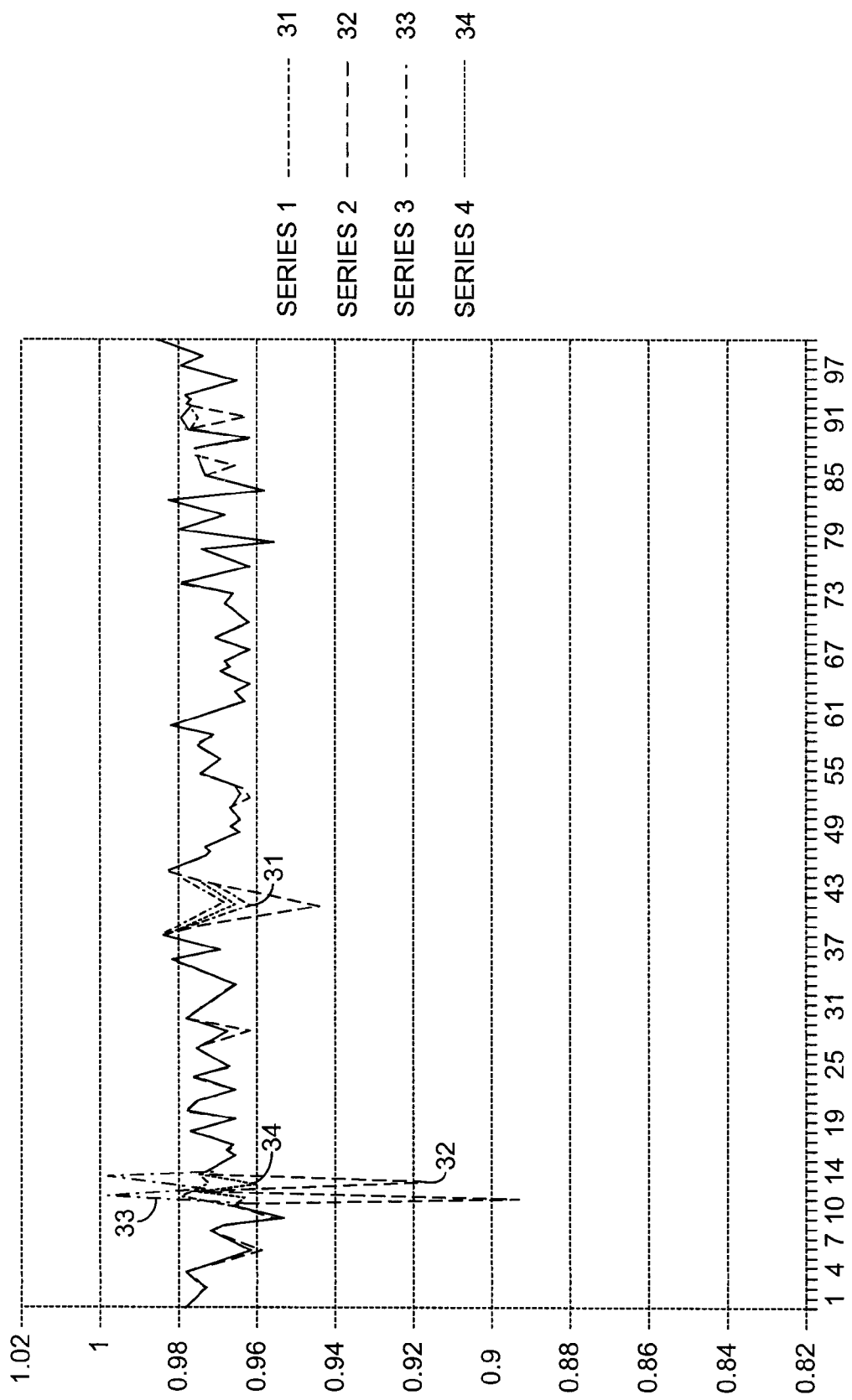
FIG. 7 depicts simulation results as detailed under the section "Simulation Results".

FIG. 7 graphically summarizes the simulation results. All data is presented for 99 different randomly selected unity traffic load configurations, each statically measured over a busy period of 1,000,000 consecutive forwarding slots, during each of which data was available for forwarding across any valid requesting port pair connection path. Line series number 31 represents the typically measured efficiency ratio represented over all $N^2$ input-output port pair combinations, when such value is measured to four significant decimal digits. Line series number 32, 33 and 34 are all measured over the same $N^2$ set of input-output port pair combinations as Line series number 31, and each is measured to four significant decimal digits. All ratios are measured with respect to the perfectly efficient ideal case.

Line series number 32 represents the worst case measured least efficient forwarding ratio. Line series 33 represents the measured efficiency of the worst case measurement of Line series 32 if that measurement is incremented by a single additional slot of granted forwarding service. Line series 34 is merely a representation of the average of values of Line series 32 and Line series 33. Line series 34 helps to compensate for the sampling error that very slow rates are susceptible to when their requested service delay approaches the measurement period of the simulation.

Line series 34 measures this worst case adjusted efficiency to fall between 98.5% and 96.1% over all 99 test cases.

In conclusion, it is to be understood that the foregoing detailed description and the accompanying drawings illustrate the principles of the invention. However, various changes and modifications may be employed without departing from the spirit and scope of the invention. Accordingly, the present invention is not limited to the specific form shown in the drawings and described in detail above.

What is claimed is:

1. A connection scheduler for a crossbar switch having N input ports and N output ports, comprising:
    a first plurality of switch elements (i) connected to said N input ports and configured to (ii) round robin arbitrate among said N output ports for each of said N input ports;
    a second plurality of switch elements (i) connected to said N output ports and configured to (ii) round robin arbitrate among said N input ports for each of said N output ports and (iii) cooperatively synchronize with said first plurality of switch elements; and
    a third plurality of switch elements configured to form a toroidal mesh with said first switch elements and said second switch elements,
    said first, said second, and said third switch elements being further configured such that a maximal feasible matching of a requesting input port of said N input ports with an associated output port of said N output ports is determined in at most N timesteps.

2. The connection scheduler of claim 1 further comprising:
    a plurality of input port controllers connected to said N input ports; and
    a plurality of output port controllers connected to said N output ports,
        wherein (i) said first and said second switch elements operate cooperatively such that only N switch elements of said first, said second, and said third switch elements need be active during any given timestep to advance a round robin position by one port position and (ii) if at any given moment of time a particular connection path of a plurality of connection paths is being considered for grant selection by one of said input port controllers then said particular connection path is also being considered during that same moment by one of said output port controllers.

3. The connection scheduler of claim 2 wherein said first and said second switch elements are further configured to cooperatively arbitrate a plurality of requests, one request of said requests for each possible said connection path.

4. The connection scheduler of claim 3 wherein said second switch elements operate such that each of the N input ports is considered on a strictly sequential basis, one per timestep for a connection grant for a current period of a data forwarding arbitration.

5. The connection scheduler of claim 4 wherein said first switch elements operate such that each of the N output ports is considered on a strictly sequential basis, one per timestep, for the connection grant for the current period of said data forwarding arbitration.

6. The connection scheduler of claim 5 wherein concurrent operations of said first switch elements are strictly synchronized such that, at any particular moment during a connection grant selection, each of said N output ports is considered for possible grant selection by exactly one of said first switch elements.

7. The connection scheduler of claim 6 wherein concurrent operations of said second switch elements are strictly synchronized such that, at any particular moment during said connection grant selection, each of said N input ports is considered for possible grant selection by exactly one of said second switch elements.

8. The connection scheduler of claim 7 wherein said first and said second switch elements are further configured such that each cyclically increments a starting position of a round robin scan by one port position at a start of said data forwarding arbitration.

9. The connection scheduler of claim 8 wherein requests for data transmission are binary signals that can only be asserted or deasserted, and which have no accompanying requested rate of transmission or other quality of service parameter.

10. The connection scheduler of claim 9 wherein said first and said second switch elements are further configured to provide a worst case difference between actual and requested intra-switch port connection service delays that is bounded by a maximum duration of N periods of said data forwarding arbitration, where N is a number of said N input ports and also the number of said N output ports.

11. The connection scheduler of claim 8 wherein said first and said second switch elements are further elaborated to support rate based traffic services at a cost of additional arbitration latency by applying said data forwarding arbitration a multiple number of times in a brief series.

12. The connection scheduler of claim 11 wherein said first and said second switch elements are further configured to implement a strict scheduling prioritization derived from requested service delays, where a period of service delay is expressed in units of a minimum data forwarding period, with said strict scheduling prioritization being accomplished by applying a small number of said data forwarding arbitrations in series, a first plurality of said requests eligible to participate in a first of a series have a greatest priority to be given grants, while a second plurality of said requests later in the series are of decreasing priority due to increasing values of requested service delays.

13. The connection scheduler of claim 12 wherein said minimum data forwarding period can be no shorter than a pipelinable latency of the data forwarding arbitration of a single connection grant matching.

14. The connection scheduler of claim 13 wherein for each of said $N^2$ possibly requested data forwarding connections, said first and said second switch elements are further configured to maintain a countdown counter per request which measures an effective time until said request is granted a connection, each said countdown counter being initialized with a requested service delay and decremented each time a forwarding slot transpires in which none of the countdown counters has a value that is less than or equal to a threshold value "Tclip".

15. The connection scheduler of claim 11 wherein a number of iterations of said data forwarding arbitration is three.

16. The connection scheduler of claim 11 wherein the number of iterations of said data forwarding arbitration is an integer value greater than or equal to one.

17. The connection scheduler of claim 11 wherein said first and said second switch elements are further configured to measure and determine a subset of a plurality of connection requests that have recently been serviced most inefficiently and consequently promote said subset to qualify for prearbitration, with a passage of said minimum data forwarding period being associated with increasing integers, said prearbitration applying to grants given for data forwarding slot X +1, if, and only if, said data forwarding arbitration applies to the grants given for data forwarding slot X.

18. The connection scheduler of claim 17 wherein said first and said second switch elements are further configured to demote and disallow a plurality of connections qualified for prearbitration as soon as said connections have gained a sufficient quota of additional service to make up for any deficit and to provide at least a temporary surplus, with a particular connection of said connections being qualified any time that is both after a moment at which a respective countdown counter decrements to a threshold value "Ton" up to and including a timeslot in which a service potential, as measured by the respective countdown counter, exceeds a threshold value "Toff".

19. The connection scheduler of claim 18 wherein:
said threshold value "Ton" is less than said threshold value "Toff".

* * * * *